No. 632,514. Patented Sept. 5, 1899.
C. COLEMAN.
ELECTRIC CABLE.
(Application filed Apr. 10, 1899.)
(No Model.)
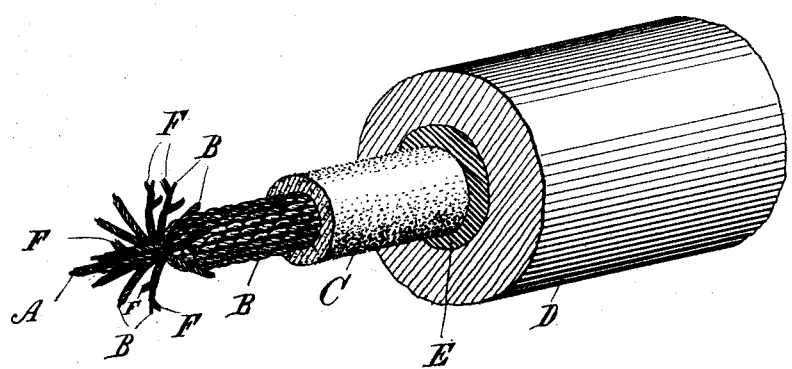

UNITED STATES PATENT OFFICE.

CLYDE COLEMAN, OF CHICAGO, ILLINOIS, ASSIGNOR, BY MESNE ASSIGNMENTS, OF TWO-THIRDS TO THE BANKERS ELECTRIC PROTECTIVE COMPANY, OF SAME PLACE.

ELECTRIC CABLE.

SPECIFICATION forming part of Letters Patent No. 632,514, dated September 5, 1899.

Original application filed October 22, 1897, Serial No. 655,997. Divided and this application filed April 10, 1899. Serial No. 712,418. (No model.)

*To all whom it may concern:*

Be it known that I, CLYDE COLEMAN, a citizen of the United States, residing at Chicago, in the county of Cook and State of Illinois, have invented certain new and useful Improvements in Electric Cables, of which the following is a specification.

This application is a division of my application filed October 22, 1897, Serial No. 655,997. The present invention relates to a cable comprising a number of conductors and is adapted for use in electrical burglar-alarm and other systems, the several conductors being so disposed that they cannot be separated one from another without either severing one or more of them or electrically connecting two or more of them, in either of which cases a signal will be given.

The object of the present invention is to provide a cable of this class in which the difficulty in separating one conductor from another is greater than in any heretofore existing cable, whereby its efficiency as a protection against surreptitious manipulation of the system is increased.

The invention consists in the features of novelty that are hereinafter fully described with reference to the accompanying drawing, which is made a part of this specification, and which shows in perspective a fragment of a cable with the several conductors at one end thereof unplatted and partly exposed.

The improved cable is made up of a core consisting of one or more substantially straight conductors A, a plurality of conductors B, braided around the core, a jacket C, woven tightly around the braided conductors, and an outer sheathing or envelop D, of lead or other ductile metal, the space between the jacket and envelop being filled with paraffin or other suitable wax, as shown at E. Each of the conductors is separately insulated, and for this purpose I prefer to inclose each in a double fibrous covering consisting of strands F of fibrous material wound spirally in opposite directions.

The interstices of the insulation of each of the conductors and also the interstices between the several insulated conductors, especially the braided ones, are filled with shellac or some other suitable cement which is hard and friable at ordinary temperatures. This is preferably accomplished by immersing the cable, before the jacket C is applied, in a bath of hot shellac or other cementing substance. Preferably the cable is first immersed in a thin solution of the cement, which will thoroughly penetrate the interstices, and afterward immersed in a thicker solution, which coats it and completely fills the interstices in its outer face, so as to present a smooth surface.

I am aware that it is old to use in an electric cable a number of insulated conductors braided together. I am also aware that it is old to construct a cable of a plurality of straight wires insulated from each other by means of coverings of silk steeped in paraffin and wrapped spirally around the conductors, another conductor similarly insulated being wrapped spirally around them. This is not the equivalent of a cable having a plurality of separately-insulated conductors braided together, with the interstices of the cable thus formed filled with a cementing substance, such as shellac, which under ordinary temperatures is hard and friable. Where paraffin is used in the manner above described, it can be melted out by the application of a comparatively low degree of heat; but this cannot be done where shellac or a similar substance is used. Furthermore, the hard friable character of the shellac itself makes it practically impossible to separate the short exposed bends or knuckles of the braided conductors without breaking one or more of them or electrically connecting two or more of them, especially where fine wires are used, as is the case in electrical burglar-alarm systems.

In the drawing I have shown four conductors arranged as a core and nine conductors braided around them; but the invention is not limited in this respect, and the number used for the core or the number braided around the core may be changed without departing from the invention.

Preferably the interstices in the woven jacket are filled with a cementing substance such as described.

What I claim as new, and desire to secure by Letters Patent, is—

1. A cable having a plurality of conductors braided together, a flexible insulation surrounding each conductor, and a cementing substance filling the interstices of the insulation, substantially as set forth.

2. A cable having a plurality of conductors braided together, a flexible insulation surrounding each conductor, and a cementing substance filling the interstices between the several braided conductors, substantially as set forth.

3. A cable having a plurality of conductors braided together, a flexible insulation surrounding each conductor, and a cementing substance filling the interstices in the insulation of each conductor and also the interstices between the several braided conductors, substantially as set forth.

4. A cable having a plurality of conductors braided together, a flexible insulation surrounding each conductor, the interstices between the braided conductors being filled with shellac, substantially as set forth.

5. A cable having a plurality of conductors, a double layer of fibrous insulating material wound spirally around each conductor in opposite directions, said insulated conductors being braided together, and a cementing substance filling the interstices of the insulation and also the interstices between the braided conductors, substantially as set forth.

6. A cable comprising a conductor, an insulation surrounding the conductor, a plurality of conductors braided around the conductor first aforesaid, each of said conductors being separately insulated, and a cementing substance filling the interstices between the several braided conductors, substantially as set forth.

7. A cable having a plurality of conductors insulated from each other and braided together, a jacket of fibrous material surrounding the braided conductors, a cementing substance filling the interstices between the braided conductors and in the fibrous jacket, and an outer covering of ductile metal, substantially as set forth.

8. A cable having a plurality of conductors insulated from each other and braided together, a jacket of fibrous material surrounding the braided conductors, a cementing substance filling the interstices between the braided conductors and in the fibrous jacket thereof, an outer covering of ductile metal, and a body of paraffin filling the space between the jacket and covering, substantially as set forth.

CLYDE COLEMAN.

Witnesses:
N. C. GRIDLEY,
L. M. HOPKINS.